June 30, 1964  J. DESLOGE  3,139,480
ELECTRICAL JUNCTION BOX WITH ECCENTRIC
SOCKETS IN A COMMON BASS
Filed Dec. 4, 1961  2 Sheets-Sheet 1

*INVENTOR.*
JOSEPH DESLOGE
BY
ATTORNEY

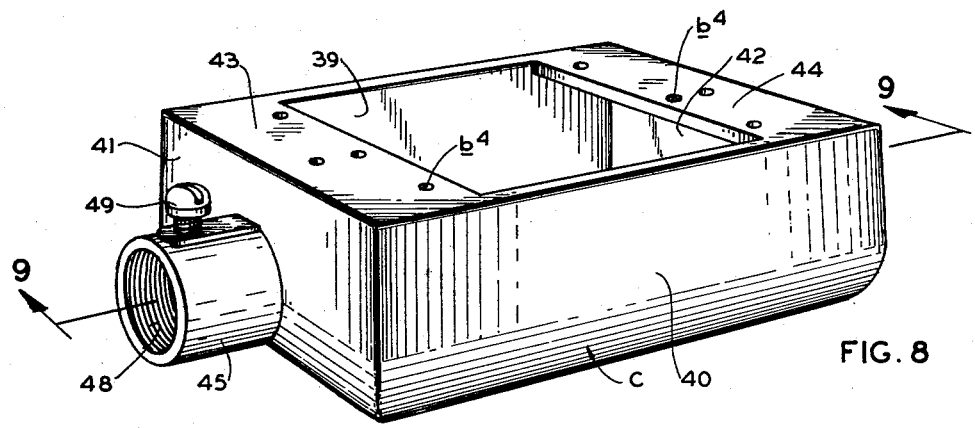
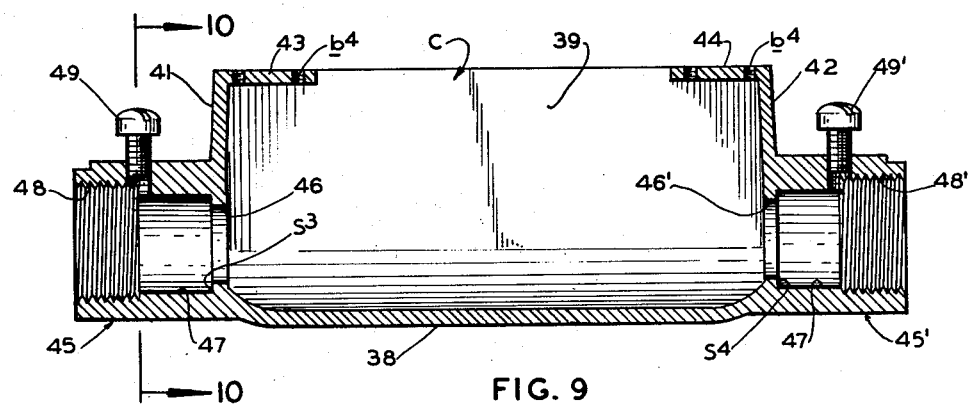
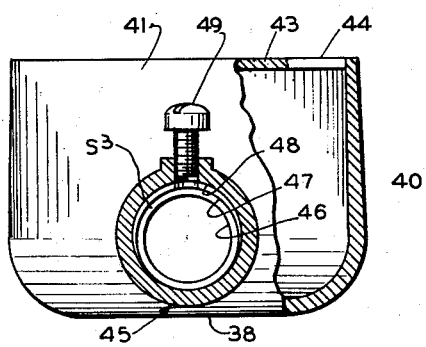 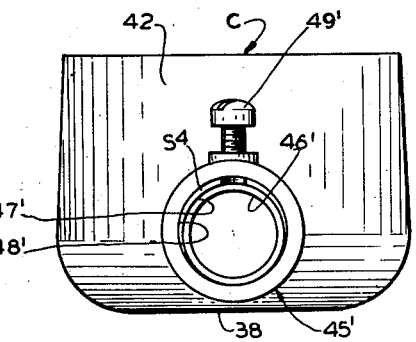
INVENTOR.
JOSEPH DESLOGE
BY
ATTORNEY

United States Patent Office 3,139,480
Patented June 30, 1964

3,139,480
ELECTRICAL JUNCTION BOX WITH ECCENTRIC SOCKETS IN A COMMON BOSS
Joseph Desloge, Florissant, Mo., assignor to Killark Electric Manufacturing Company, St. Louis, Mo., a corporation of Missouri
Filed Dec. 4, 1961, Ser. No. 156,850
8 Claims. (Cl. 174—65)

This invention relates in general to electrical wiring devices and, more particularly, to electrical outlet boxes or junction boxes. Practically all existing building codes and other regulations governing electrical wiring, require the use of some type of metal containers or so-called junction boxes for housing switches, light sockets, electrical outlets, and making various kinds of electrical connections. Usually the wires or conductors are enclosed in thin-walled metal tubing or pipe which may be mechanically connected to the junction box by threads or may be clamped in place. Ordinarily, where the wiring must be weather-proof, or vapor-proof, pipe and threaded connections are mandatory and in household or light commercial installations, clamped fittings may be used. Inasmuch as such alternative forms of mechanical connection are frequently encountered by electricians and electrical wiring contractors, there is an existing need for a junction box which can accept threaded pipe or effect a clamped connection to unthreaded tubing. Some efforts have been made to solve this problem by incorporating wedging and clamping attachments in some types of junction boxes but such expedients have proven to be unsatisfactory for the reason that the tubing is not securely gripped. Moreover, the tubing is forced out of true axial alignment with the socket or so-called "hub" into which it is inserted so that the line of tubing is not straight. This, of course, results in a wiring installation that does not have a workman-like appearance and, where several junction boxes must be installed along a vertical or horizontal line, as is often the case, the line of tubing from one junction box must be slightly bowed or otherwise distorted to fit into the next succeeding junction box.

It is, therefore, the primary object of the present invention to provide a junction box which is capable of either threaded connection with conduit pipe or clamping connection with conduit tubing.

It is another object of the present invention to provide a junction box of the type stated which will hold clamped conduit tubing in true axial alignment with the longitudinal axis of the socket or hub in which the tubing is inserted.

It is a further object of the present invention to provide a junction box of the type stated which is capable of effecting a secure and satisfactory weatherproof threaded connection with conduit pipe.

It is an additional object of the present invention to provide a junction box of the type stated which is economical in construction and which can be installed or connected up in a relatively quick convenient manner.

It is also an object of the present invention to provide a junction box of the type stated which is compact and does not have an excessive amount of external attachments or auxiliary fittings which complicate the structure or detract from the symmetrical design thereof so that the complete installation will present a workman-like appearance.

With the above and other objects in view my invention resides in the novel features of form, construction, arrangement, and combination of parts presently described and pointed out in the claims.

In the accompanying drawings—

FIG. 8 is a perspective view of another modified form of junction box constructed in accordance with and embodying the present invention;

FIG. 9 is a longitudinal sectional view taken along line 9—9 of FIG. 8;

FIG. 10 is a transverse sectional view taken along line 10—10 of FIG. 9 and partially broken away to show the interior of the junction box; and FIG. 11 is an end elevational view of the modified form of junction box shown in FIG. 8.

Figures 1, 2, 3, 4, 5, 6, 7:
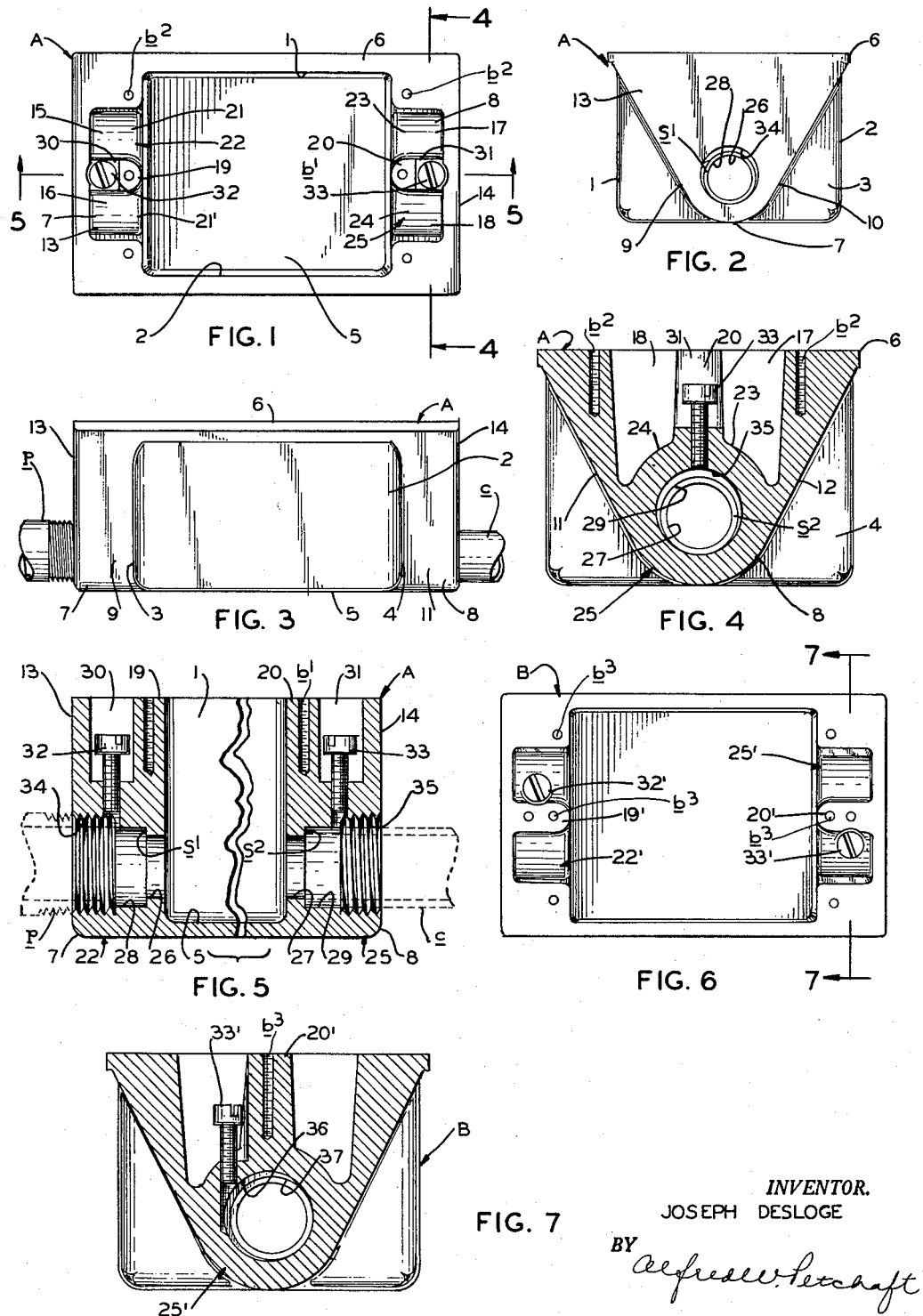
FIG. 1 is a top plan view of a junction box constructed in accordance with and embodying the present invention.
FIG. 2 is an end elevational view of the junction box.
FIG. 3 is a side elevational view of the junction box.
FIG. 4 is a transverse sectional view taken along line 4—4 of FIG. 1.
FIG. 5 is a fragmentary longitudinal sectional view taken along line 5—5 of FIG. 1.
FIG. 6 is a top plan view of a modified form of junction box constructed in accordance with and embodying the present invention.
FIG. 7 is a transverse sectional view taken along line 7—7 of FIG. 6.

Referring now in more detail and by reference characters to the drawings, which illustrate practical embodiments of the present invention, A designates a junction box formed preferably by die-casting from aluminum integrally including longitudinal side walls 1, 2, and transverse end walls 3, 4, interconnected along their bottom margins by a flat bottom wall 5. Around their upper margins, the side walls 1, 2, and end walls 3, 4, are interconnected by a flat perimetral flange 6.

Projecting outwardly from each end of the walls 3, 4, are somewhat triangular bosses 7, 8, respectively, having downwardly converging lateral faces 9, 10, and 11, 12, which extend from the outer longitudinal margins of the flange 6 inwardly and downwardly toward the centerline of the bottom wall 1 and are interconnected by somewhat semi-circular surfaces 13, 14. The bosses 7, 8, are each relieved downwardly from the flange 6 and inwardly from the inner faces of the end walls 3, 4, respectively, to provide pairs of recesses 15, 16, and 17, 18, separated by central pillars 19, 20, having internally threaded bores $b^1$ in their top faces for receiving conventional screws and, similarly, the upper faces of the bosses 7, 8, are provided with internally threaded bores $b^2$. The cover plates, electrical switches and similar conventional components may be secured in place by screws. Since such components are entirely conventional, they are not shown or described herein.

The bottom surfaces 21, 21', of the recesses 15, 16, are circular arcs concentric with the surface 13 and, in effect, define a substantially cylindrical hub 22. Similarly, the bottom surfaces 23, 24, of the recesses 17, 18, are circular arcs concentric with the surface 14 and, in effect, define a substantially cylindrical hub 25.

Each of the hubs 22, 25, are axially bored to provide cylindrical openings 26, 27, respectively, into the interior of the junction box A and are counterboxed to provide smooth-faced cylindrical socket-portions 28, 29, which are concentric with, and somewhat larger than, the openings 26, 27, so as to form stop-shoulders $s^1$, $s^2$. The pillars 19, 20, are transversely cut away to provide laterally open-ended slots 30, 31, and the hubs 22, 25, are drilled and tapped at the bottom of these slots 30, 31, for accommodating clamping screws 32, 33, which extend through the hubs 22, 25, and project radially into the socket-portions 28, 29, respectively. The socket-portions 28, 29, are sized so that the ends of conduit tubing $c$ can be slipped freely therein up against the stop-shoulders $s^1$, $s^2$, and securely retained by turning the clamping screws 32, 33, down into engagement therewith.

The socket-portions 28, 29, are counterbored from their outer ends to provide auxiliary sockets 34, 35, which are somewhat larger in diameter than, and eccentric to, the socket-portions 28, 29, along the diametral planes which are respectively coincident with the centerlines of the clamping screws 32, 33. These auxiliary sockets are internally threaded with pipe threads for receiving the ends of conduit pipe p. The amount of eccentricity is so arranged that the top or crown of the threads will be tangent to the surfaces of the socket-portions 28, 29, along axial lines which are diametrally opposite to the the centerlines of the clamping screws 32, 33, respectively. Thus, the so-called "bottom sections" of the thread-arcs will serve as a continuation of the clamping-lands of the socket-portions 28, 29, and either the conduit pipe p or conduit tubing c whichever is used, will be held in true axial parallelism with the axis of the openings 26, 27. Moreover, the length of the engaged portion of conduit-pipe p or conduit tubing c will comply with the regulations or requirements of electrical codes without unduly increasing the axial length or size of the hubs 22, 25.

It should be understood that the junction box A, as shown, has two axially aligned hubs 22, 25, sized for accepting the same nominal sizes of conduit tubing c and conduit pipe p. Of course, the actual outside diameter of pipe is always slightly larger than the actual outside diameter of tubing of the same nominal size, which accounts for the somewhat smaller actual diameter of the socket-portions 28, 29, as compared with the somewhat larger diameter of the auxiliary sockets 34, 35. Furthermore, it will be obvious that the hubs 22, 25, may be of different sizes and in different relative locations. In fact, it is also possible to employ any number of hubs, thereby providing single connection junction boxes, as well as junction boxes for making right-angle connections, T-connections, and cross-connections.

It is also possible to provide a modified form of junction box B, as shown in FIGS. 6 and 7, which is substantially similar in all respects to the previously described junction box A, except that it is provided with non-slotted pillars 19', 20', and clamping screws 32', 33', which are threaded into hubs 22', 25', along lines which are parallel to, but laterally displaced from, the pillars 19', 20', as best seen in FIG. 7. Thus, the diametral lines along which clamping pressure is applied will be at an angle to the centerline of the pillars 19', 20', and the threaded pipe-receiving bore 36 will be eccentric to the conduit-receiving socket-portion 37 along this line so that the clamping land will be diametrally opposite to the point of application of clamping. As will be seen in FIG. 6, the junction box B is provided with internally threaded bores $b^3$ which are identical in construction and function with the bores $b^1$, $b^2$.

It is also possible to provide a further modified form of junction box C, as shown in FIGS. 8 to 11, inclusive, which is somewhat similar to the previously described junction box A, but is die-cast with a multiple core mold of the conventional type and integrally includes a bottom wall 38, side walls 39, 40, and end walls 41, 42, the latter being integrally connected to the side walls across their upper margins by inwardly extending flat flanges 43, 44, which are suitably bored and tapped to provide a series of internally threaded bores $b^4$ similar in construction and function with the bores $b^1$, $b^2$. It will be also noted by reference to FIGS. 9 and 10 that the side walls 39, 40, and end walls 41, 42, are inwardly and upwardly tapered to facilitate removal from the female portions of the mold or die.

Formed integrally on, and centrally of, the end walls 41, 42, are outwardly projecting cylindrical bosses or so-called "hubs" 45, 45', which preferably have coincident longitudinal centerlines which are coplanar with the longitudinal centerline of the junction box C. Internally, the bosses 45, 45', are respectively bored and counterbored to provide openings 46, 46', annular abutment shoulders $s^3$, $s^4$, smooth-faced conduit receiving socket-portions 47, 47', and eccentric internally threaded pipe-receiving auxiliary sockets 48, 48'. The cylindrical bosses or hubs 45, 45', are also radially drilled and tapped along the juncture plane between the socket-portions 47, 47', and the auxiliary sockets 48, 48', to receive clamping screws 49, 49', which are similar in junction to the previously described clamping screws 32.

It will also be apparent that all pressure surfaces of the junction boxes constructed in accordance with the present invention are inclined at least to a slight degree toward the bottom wall to provide for satisfactory withdrawal from the dies at the completion of the die-casting operation.

It should be understood that changes and modifications in the form, construction, arrangement, and combination of the several parts of the electrical wiring devices may be made and substituted for those herein shown and described without departing from the nature and principle of my invention.

Having thus described my invention, what I claim and desire to secure by Letters Patent is:

1. A junction box having a hub-forming element for optionally accommodating either of two different types of conduit, said hub-forming element having an opening at its inner end which communicates with the interior of the junction box, said hub-forming element also having a first socket of circular cross-sectional shape formed therein outwardly with respect to the opening, said hub-forming element further having a second socket of circular cross-sectional shape formed therein in axially outward relation to, and opening endwise into, the first socket, said second socket being of larger diameter than the first socket, said sockets having their respective longitudinal centerlines in spaced parallel relation, the distance between said centerlines being substantially equal to the difference in the respective inside diametral sizes of said sockets so that the innermost surfaces of said sockets are tangent to a common axial line, thereby establishing a single axially continuous clamping land common to both sockets, and means operatively mounted in the hub-forming element for cooperation with the first socket for retaining one type of conduit in the first socket, said second socket having means for optionally retaining another type of conduit in said second socket.

2. A junction box having a hub-forming element for optionally accommodating either of two different types of conduit, said hub-forming element having an opening at its inner end communicating with the interior of the junction box, said hub-forming element also having a first smooth-surfaced cylindrical socket formed therein outwardly with respect to the opening, said hub-forming element further having a second internally threaded cylindrical socket formed therein in axially outward relation to, and opening endwise into, the first socket, said second socket being of larger diameter than the first socket, said sockets having their respective longitudinal centerlines in spaced parallel relation, the distance between said centerlines being substantially equal to the difference between the respective inside diametral size of the first socket and the inside diametral size of the second socket as measured from the crest of the threads thereof so that the inner surface of the first socket and the crest of the threads of the second socket are tangent to a common axial line, thereby establishing a single axially continuous clamping land common to both sockets, and means operatively mounted in the hub-forming element for cooperation with the first socket for retaining one type of conduit in the first socket, said second socket having means for optionally retaining another type of conduit in said second socket.

3. A junction box according to claim 1, in which the first and second sockets open into each other along a common transverse plane and in which the means operatively mounted in the hub-forming element for cooperation with the first socket is a clamping screw which enters said hub-forming element along a radial line which is substantially within said selected plane.

4. A junction box according to claim 3, in which the radial line along which the clamping screw enters the hub-forming element is diametrally opposite to the clamping land and thereby is adapted to force the first-named type of conduit into tightly gripped abutment with said land substantially along the entire length of said land.

5. A junction box according to claim 1, in which the means mounted in the hub-forming element is a clamping screw.

6. A junction box according to claim 4, in which the first and second sockets open into each other along a diametral plane and in which the clamping screw is located with its centerline lying within said diametral plane for retaining one type of conduit in the socket-portion.

7. A junction box having a hub-forming element for optionally accommodating either of two different types of conduit, said hub-forming element having an opening at its inner end communicating with the interior of the junction box, said hub-forming element also having a first socket formed therein outwardly with respect to the opening and a second socket formed therein outwardly of the first socket, said second socket being diametrally larger than, and also being eccentric with respect to, the first socket, said second socket opening at its inner end into the first socket along a diametral plane, a clamping screw threadedly mounted in the hub-forming element and extending into said sockets in the region of said diametral plane, said screw being adapted to apply clamping pressure along a line lying within the diametral plane for retaining one type of conduit in the first socket, a portion of the second socket being tangent to the first socket along a common axial line so as to form therewith a single axially continuous clamping land so that when clamping pressure is applied to the type of conduit adapted to fit in the first socket the latter will be clamped in substantially axial position with respect to the first socket, and means within the second socket for alternatively retaining another type of conduit in the second socket.

8. A junction box according to claim 7, in which the clamping screw, by reason of its location, will act as a set-screw for alternatively retaining the other type of conduit in said second socket.

References Cited in the file of this patent

UNITED STATES PATENTS

| 312,867 | Lang et al. | Feb. 24, 1885 |
| 867,236 | Blood | Oct. 1, 1907 |
| 1,000,043 | Scism | Aug. 8, 1911 |
| 1,592,454 | Frederickson | July 13, 1926 |
| 1,756,159 | Liebowitz | Apr. 29, 1930 |
| 2,052,394 | Fullman | Aug. 25, 1936 |
| 2,535,658 | Strom | Dec. 26, 1950 |
| 2,947,800 | Badeau et al. | Aug. 2, 1960 |
| 3,024,937 | Kooi | Mar. 13, 1962 |

FOREIGN PATENTS

| 38,213 | Sweden | Feb. 3, 1915 |
| 803,864 | Germany | Apr. 12, 1951 |
| 1,025,039 | Germany | Feb. 27, 1958 |

UNITED STATES PATENT OFFICE
CERTIFICATE OF CORRECTION

Patent No. 3,139,480                      June 30, 1964

Joseph Desloge

It is hereby certified that error appears in the above numbered patent requiring correction and that the said Letters Patent should read as corrected below.

In the drawings, Sheets 1 and 2, for "BASS", each occurrence, read -- BOSS --.

Signed and sealed this 10th day of November 1964.

(SEAL)
Attest:

ERNEST W. SWIDER
Attesting Officer

EDWARD J. BRENNER
Commissioner of Patents